(12) United States Patent
Maria et al.

(10) Patent No.: US 11,463,311 B2
(45) Date of Patent: *Oct. 4, 2022

(54) SOFTWARE DEFINED NETWORK LIFECYCLE TRACKING AND MANAGEMENT

(71) Applicants: AT&T Mobility II LLC, Atlanta, GA (US); AT&T Intellectual Property I, L.P., Atlanta, GA (US)

(72) Inventors: Arturo Maria, Bellevue, WA (US); Jeffrey Joseph Farah, North Brunswick, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,302

(22) Filed: Aug. 24, 2021

(65) Prior Publication Data

US 2021/0385132 A1    Dec. 9, 2021

Related U.S. Application Data

(63) Continuation of application No. 16/711,058, filed on Dec. 11, 2019, now Pat. No. 11,140,033.

(51) Int. Cl.
*H04L 12/24* (2006.01)
*H04L 12/26* (2006.01)
(Continued)

(52) U.S. Cl.
CPC ...... *H04L 41/0823* (2013.01); *H04L 41/0886* (2013.01); *H04L 41/145* (2013.01); *H04L 43/0817* (2013.01); *H04L 43/091* (2022.05)

(58) Field of Classification Search
CPC ............. H04L 41/0823; H04L 41/0886; H04L 41/145; H04L 41/5035; H04L 43/0817
See application file for complete search history.

(56) References Cited

U.S. PATENT DOCUMENTS

2009/0288139 A1    11/2009  Huber et al.
2012/0014277 A1*   1/2012  Eckley, IV ............ H04L 43/022
                                                                  370/252
(Continued)

FOREIGN PATENT DOCUMENTS

IN       201941041404 A  * 10/2019  .............. H04W 4/90

*Primary Examiner* — Christopher B Robinson
(74) *Attorney, Agent, or Firm* — Guntin & Gust, PLC; Robert Gingher

(57) ABSTRACT

A device in an evolved packet core (EPC) which includes a processor and a memory. The processor effectuates operations including receiving, from one or more devices residing within a customer premise equipment (CPE) portion of a telecommunications network, sensor data associated with one or more customers and in response to receiving the sensor data, generating a data request for an ecosystem status for the CPE portion of the telecommunications network. The processor further effectuates operations including obtaining customer information for the one or more customers and creating an analytics environment, using the customer information, for the one or more customers. The processor further effectuates operations including performing, within the analytics environment, analytics on the sensor data to determine a state of the CPE portion of the telecommunications network for the one or more customers and in response to performing analytics on the sensor data, optimizing the telecommunications network.

20 Claims, 11 Drawing Sheets

(51) Int. Cl.
*G06N 5/02* (2006.01)
*H04L 41/0823* (2022.01)
*H04L 41/08* (2022.01)
*H04L 43/0817* (2022.01)
*H04L 41/14* (2022.01)
*H04L 43/091* (2022.01)

(56) References Cited

U.S. PATENT DOCUMENTS

| | | | |
|---|---|---|---|
| 2016/0157252 A1* | 6/2016 | Lu | H04W 72/087 |
| | | | 370/329 |
| 2016/0261465 A1* | 9/2016 | Gupta | H04L 12/2816 |
| 2016/0315826 A1* | 10/2016 | Abdulnour | H04L 41/5067 |
| 2017/0272311 A1 | 9/2017 | Kerpez et al. | |
| 2017/0357528 A1 | 12/2017 | Puranik et al. | |
| 2018/0205619 A1 | 7/2018 | Rios et al. | |
| 2018/0220312 A1 | 8/2018 | Guttenfelder et al. | |
| 2019/0014356 A1* | 1/2019 | Rieger | H04N 21/251 |
| 2019/0058656 A1 | 2/2019 | Gundersen et al. | |
| 2020/0145299 A1* | 5/2020 | Do | H04L 41/16 |

\* cited by examiner

SOFTWARE DEFINED NETWORK LIFECYCLE TRACKING AND MANAGEMENT

CROSS REFERENCE TO RELATED APPLICATIONS

This application is a continuation of, and claims priority to, U.S. patent application Ser. No. 16/711,058, filed Dec. 11, 2019, entitled "Software Defined Network Lifecycle Tracking and Management," the entire contents of which are hereby incorporated herein by reference.

TECHNICAL FIELD

This disclosure is directed to a system and method for managing software-defined networks, and, more specifically, to tracking and management of software-defined networks as they evolve over time.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs) to be instantiated. In turn, VMs may require various resources, such as memory, virtual central processing units (vCPUs), and network interfaces or network interface cards (NICs).

When the communications network implements fifth generation cellular network technology (5G), utilizing a Control and User Plane Separation (CUPS) is important to 5G networks because it allows operators to separate the evolved packet core (EPC) into a control plane that can reside in a centralized location, for example the middle of the country, and for the user plane to be placed closer to the application it is supporting. This type of separation may be helpful for applications such as, the connected car. In that scenario, a network operator can place the EPC user plane in a data center in a city so that it is closer to the application and therefore reduces the latency. This scenario also works well for high-bandwidth applications like video. Because the core user plane is located closer to the end user the operator does not have to backhaul traffic all the way to central hub and therefore provides more efficient processing.

This background information is provided to reveal information believed by the applicant to be of possible relevance. No admission is necessarily intended, nor should be construed, that any of the preceding information constitutes prior art.

SUMMARY

There is a need to provide a CUPS architecture that can collect data for an associated communications network dynamically, analyze network parameters, and adjust aspects of the communications network based on the analysis of network parameters. Disclosed herein is a data capture and simulation engine that may reside in an evolved packet core (EPC) hereby referred to as the Core Simulation Tool (CST). The CST can collect data from a RAN, IoT sensors, or other devices and use EPC network elements to perform analysis and simulations on the collected data, combine the collected data with additional information, and dynamically change network parameters in response to network conditions.

The present disclosure is directed to a device in an evolved packet core (EPC) having a processor and a memory coupled with the processor. The processor effectuates operations including receiving, from one or more devices residing within a customer premise equipment (CPE) portion of a telecommunications network, sensor data associated with one or more customers. The processor further effectuates operations including in response to receiving the sensor data, generating a data request for an ecosystem status for the CPE portion of the telecommunications network. The processor further effectuates operations including obtaining customer information for the one or more customers. The processor further effectuates operations including creating an analytics environment, using the customer information, for the one or more customers. The processor further effectuates operations including performing, within the analytics environment, analytics on the sensor data to determine a state of the CPE portion of the telecommunications network for the one or more customers. The processor further effectuates operations including in response to performing analytics on the sensor data, optimizing the telecommunications network.

The present disclosure is directed to a computer-implemented method. The computer-implemented method includes receiving, from one or more devices residing within a customer premise equipment (CPE) portion of a telecommunications network, sensor data associated with one or more customers. The computer-implemented method further includes in response to receiving the sensor data, generating a data request for an ecosystem status for the CPE portion of the telecommunications network. The computer-implemented method further includes obtaining customer information for the one or more customers. The computer-implemented method further includes creating an analytics environment, using the customer information, for the one or more customers. The computer-implemented method further includes performing, within the analytics environment, analytics on the sensor data to determine a state of the CPE portion of the telecommunications network for the one or more customers. The computer-implemented method further includes in response to performing analytics on the sensor data, optimizing the telecommunications network.

The present disclosure is directed to a computer-readable storage medium storing executable instructions that when executed by a computing device cause said computing device to effectuate operations including receiving, from one or more devices residing within a customer premise equipment (CPE) portion of a telecommunications network, sensor data associated with one or more customers. Operations further include in response to receiving the sensor data, generating a data request for an ecosystem status for the CPE portion of the telecommunications network. Operations further include obtaining customer information for the one or more customers. Operations further include creating an analytics environment, using the customer information, for the one or more customers. Operations further include performing, within the analytics environment, analytics on the sensor data to determine a state of the CPE portion of the telecommunications network for the one or more customers. Operations further include in response to performing analytics on the sensor data, optimizing the telecommunications network.

The present disclosure is directed to a device in an evolved packet core (EPC) having a processor and a memory coupled with the processor. The processor effectuates operations including deploying a simulation tool within a telecommunications network, wherein the simulation tool is a virtual network function within the telecommunications network; receiving sensor data associated with one or more customer premise equipment (CPE) devices of a CPE network of a plurality of CPE networks within the telecommunications network; performing analytics on the sensor data of the one or more CPE devices within the CPE network; based on the performing of analytics on the sensor data, determining a status of the CPE network; and based on the status of the CPE network, optimizing the CPE network.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
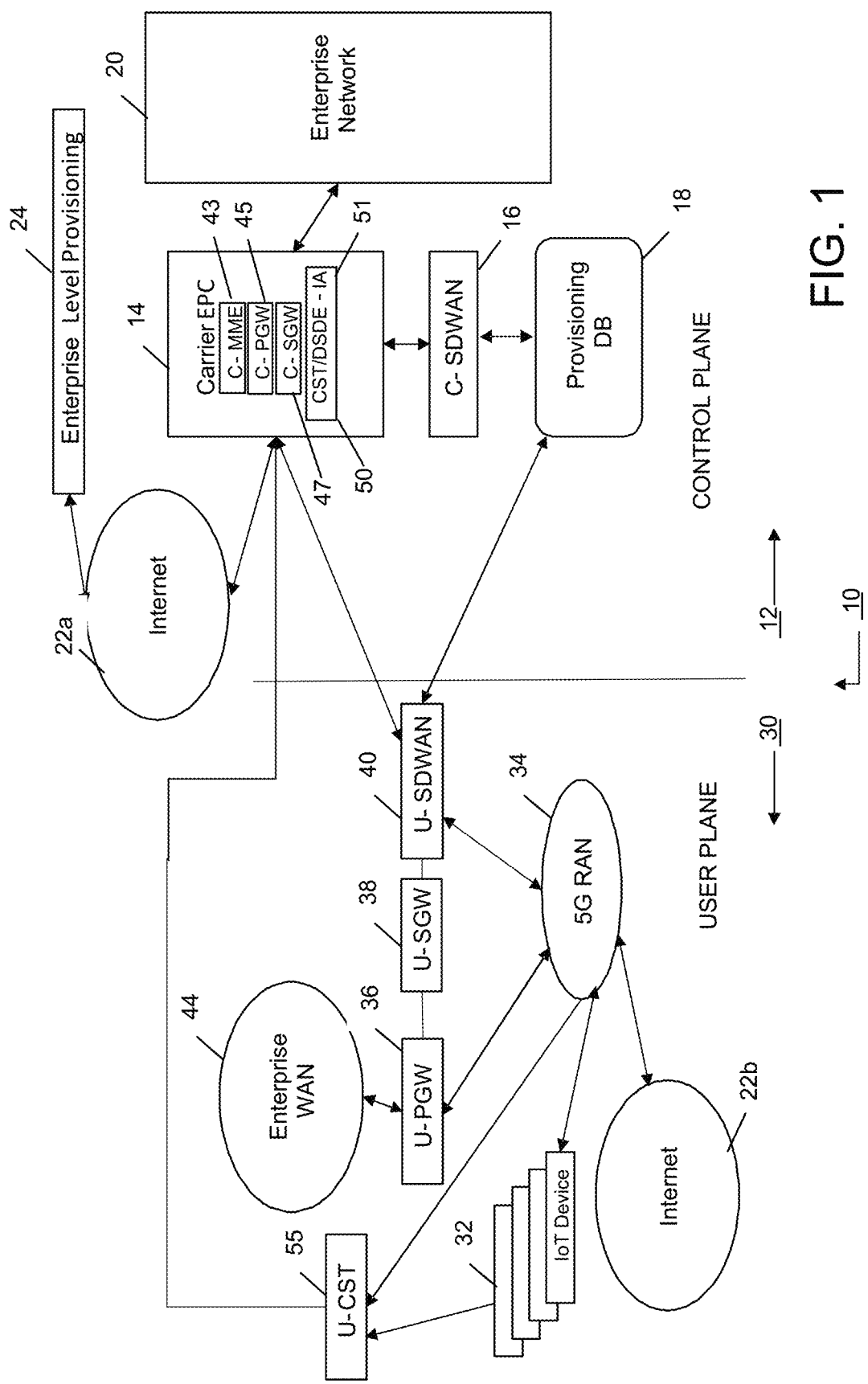
FIG. 1 is a block diagram of an exemplary operating environment in accordance with the present disclosure.

The internet of things (IoT) may be described as a computing concept describing an idea of physical devices (computing devices, sensors, mechanical and digital machines, etc.) being connected to the Internet and being able to identify themselves to other devices using unique identifiers (UIDs). The physical devices can use their UID and connection to the Internet to transfer data (IoT data) without requiring human-to-human or human-to-computer interaction.

Conventionally, IoT data is extracted from various IoT devices (e.g., smart meters, commercial security systems, traffic monitoring systems, weather monitoring systems, vehicles, smart home devices and sensors), which may utilize different protocols. The extracted IoT data can be forwarded to various gateways for protocol translation where the IoT data of the various sensors are translated and compiled to gain insight into an ecosystem (e.g., a communications network, building, system, device, etc.). The gateways receiving the IoT data can forward the IoT data to a Cloud database (e.g., Microsoft Azure SQL Database, Amazon Web Services Database, Google Cloud SQL Database, etc.) for processing. For example, the IoT data can be related to a communications network having an Evolved Packet Core (EPC) that can forward the IoT data to the Cloud database. This processing typically includes extraction, transformation and loading of data into another database(s), which can be accessed for analysis. Usually, the processing of the collected IoT data takes place outside of the EPC. However, processing IoT data outside of the EPC fails to reflect data associated with individual IoT sensors, information associated with specific cell sites, authentication vectors provided to a Mobility Management Entity and location based services (LBS) information associated with each of the IoT sensors, as well as performance aspects and security information, which only exists within the EPC core of a carrier and can be obtained faster from associated network elements. Analyzing an ecosystem with incomplete information can lead to an incomplete assessment of the state or status of the ecosystem. Accordingly, providing an analytics environment within the EPC that can process the IoT data, as well as the data associated with individual IoT sensors, would be beneficial by creating greater efficiencies, performance, security, and control by the network carrier. In addition, providing an analytics environment within the EPC that can process location information for each of the IoT sensors, performance aspects, and security information would also be beneficial.

The present disclosure includes new and novel network analysis and management tool (core simulation tool) that can collect IoT data and RAN data, as well as a software defined engine (SDE) that can be used to create an analytics environment within the EPC. While the system and method will be described herein in an exemplary configuration in which the core simulation tool (CST) operates in an EPC of a 5G network, the system and method of the present disclosure can be deployed at other locations within a network and may be implemented in a non-5G CUPS environment.

On a customer premise side, software-defined network equipment may host multiple VNFs which will be referred to as a user plane SD-WAN gateway (U-SDWAN). The U-SDWAN gateway may be managed by a control plane SDWAN orchestrator (C-SDWAN) in a 5G core network. The U-SDWAN may be logically placed in communication with user plane of the serving gateway (U-SGW) and the user plane of the packet data network gateway (U-PGW) at the customer premises. The U-SDWAN residing in the customer premises may communicate with other U-SDWANs at other customer locations. Multiple VNFs may be established in each U-SDWAN as needed or desired.

On a carrier network side, corresponding control planes may form a part of the Evolved Packet Core (EPC), which may, for example, include the control plane Mobility Management Entity (C-MME), control plane of the serving gateway (C-SGW), and the control plane of the packet data network gateway (C-PGW).

The U-SDWAN may route packets originating from the mobile or fixed 5G RAN to the appropriate destination. In operation in one embodiment, an IoT device may connect with the 5G RAN, via a wired connection or a wireless connection, and establish a session with the enterprise network through the EPC by being authenticated by the control plane C-MME and then establishing a session with the C-SGW and C-PGW. The IoT device may then establish a session with the U-SGW. The U-SGW may forward the data to the U-SDWAN being managed by C-SDWAN. The U-SDWAN may establish one or more user plane VNFs. The U-VNF may route the packets to entities outside of the carrier network or to multiple customer locations. The C-SDWAN may provide the policy considerations derived from the enterprise network with intelligence in the U-SDWAN routing the packets through various possible connections. The C-SDWAN may also communicate with other orchestrators outside of the carrier environment and interface with enterprise customers via an external web interface. The C-SDWAN and the U-SDWAN may communicate to update policies as requested by the network or the customer.

As non-limiting example, the analytics environment within the EPC may include analytical databases and associated tools. The analytics environment can analyze IoT data from sensors, data associated with individual IoT sensors, a location of each of the IoT sensors, a Radio Access Network (RAN), performance aspects of the RAN or telecommunications network in general, and security information to determine a state of the communications network, and dynamically adjust aspects of the communications network based on the determined state of the communications network. The core simulation tool (CST) may be placed within the EPC and may be implemented as a user plane Virtual Network Function (VNF) (uCST) that may be placed within a customer premises.

FIG. 1 shows an exemplary systems architecture 10 of a 5G CUPS architecture with a network portion 12 and a customer premise equipment (CPE) portion 30. Consistent with the CUPS architecture, the network portion 12 includes one or more control planes having various components and the CPE portion 30 includes a user plane having various components.

While the network portion 12 is described in further detail below, the block diagram of FIG. 1 shows the exemplary network portion 12 as it may be configured in accordance with the present disclosure. On a carrier network side of systems architecture 10 (network portion 12), corresponding control planes may form a network carrier EPC 14. Within the EPC 14, there is shown a control plane of the mobility management entity (MME) (C-MME 43), a control plane of the PGW (C-PGW 45), a control plane of the SGW (C-SGW 47), and a core simulation tool (CST) 50 that includes a dynamic software defined engine for IoT analytics (DSDE-IA) 51. The EPC 14 interacts with the enterprise network 20, which may be a private or shared network operated by a network carrier or by an enterprise customer. The EPC 14 may connect with the Internet 22a through a direct connection or through an internet service provider. Provisioning of the EPC 14 and IoT sensors 32 may be performed by the enterprise customer by accessing the enterprise level provisioning interface 24 accessed through the to the Internet 22a. The provisioning may also be done by the network carrier on behalf of an enterprise customer. Note that the Internet portions 22a and 22b of FIG. 1 may be considered to be part of the global Internet; however, Internet portions 22a and 22b are referenced separately herein only for the convenience in describing interface to the Internet with respect to the network portion 12 and the CPE portion 30 of system 10, and the recognition that actual Internet access points may differ between those portions.

There is also shown a C-SDWAN 16. The C-SDWAN 16 may, among other functions, control the policies to be implemented by the network carrier globally or geographically or by individual enterprise customers. The C-SDWAN 16 may be provisioned with provisioning data stored in a provisioning database 18. The C-SDWAN 16 may thus be configured to form part of the EPC 14 or to closely interact with the EPC 14 on the carrier network portion 12. Likewise, the C-SDWAN 16 may be configured to interact with the enterprise customer network 20, the enterprise level provisioning interface 24 and the provisioning database 18. With the C-SDWAN 16 being software-defined, multiple instances of the control plane WAN may be implemented for multiple-enterprise customers or individual customers being serviced by the network carrier.

Turning to the CPE portion 30 of FIG. 1, there is shown the user planes corresponding to the control planes discussed above. There is a U-PGW 36, a U-SGW 38, and a U-SDWAN 40. Each of the U-PGW 36, U-SGW 38, and the U-SDWAN 40 may be in communication with each other, directly or indirectly through one of the interfaces as shown in FIG. 1. The U-PGW 26 and the U-SGW 38 may functionally operate as is known by those skilled in the art of telecommunications using the 5G CUPS architecture. For example, the U-PGW 36 may interface and exchange data with an enterprise wide area network, shown as Enterprise WAN 44. That U-PGW 36 may thus provide a gateway to and from the Enterprise WAN 44 from and to the 5G Radio Access Network (RAN) 34. One or more mobile devices 32 may also access the 5G RAN 34.

There may be one or more U-SDWANs 40 in any architecture. Enterprises may configure the U-SDWANs 40 to meet specific or personalized processing requirements. For example, different U-SDWANs 40 may operate using different policies received from the C-SDWAN 16 described below. There may be different policies for different devices, users, or classes of users. Within each U-SDWAN, one or more U-VNFs may be instantiated.

There may also be a communication interface between the 5G RAN 34 and the internet 22b. As such, there is an established communication path between IoT devices 32, the enterprise WAN 44 and the Internet 22b. In this example, the enterprise WAN 44 may be a traditional enterprise WAN connecting multiple customer sites through a wide area network. It may be a software-defined WAN which connects enterprise networks including branch offices and data centers over large geographic distances. Those connections may, for example, use broadband internet, 4G, Long-Term Evolution (LTE) or Multiprotocol Label Switching (MPLS) connections. With reference to the U-SDWAN 40, there are shown exemplary connections to the 5G RAN 34, the EPC 14 and, directly or indirectly, to the C-SDWAN 16, and provisioning database 18.

The CST 50 may collect data from the 5G RAN 34, IoT devices 32, and other devices in order to perform an integrated and aggregated analysis using, for example, authentication vectors in the MME, location information in the LBS servers, policy parameters in a Policy and Charging Rules Function (PCRF), evolved Node B (eNodeB) information, other information contained in a Home Subscriber Server (HSS) associated with a given network element. The analysis performed by the CST 50, as well as simulations may be performed inside of the EPC 14. In 5G networks, a user plane Virtual Network Function (VNF) (uCST) 55 may also be employed, which may be created and controlled via the CST 50. The uCST 55 may reside on a customer premises. In addition, more than one uCST 55 may be employed. The uCST 55 may be used to collect the data locally to perform a customer specific analysis, as well as forward the collected data to the CST 50 in order to perform the integrated and aggregated analysis. The uCST 55 may be deployed anywhere in the 5G network when authorized by the CST 50, as well as a customer when the uCST 55 resides on a customer premises.

In an exemplary instance where the CST 50 analyses data collected from IoT devices 32, data produced by the IoT devices 32 (e.g., smart meters, commercial security systems, traffic monitoring systems, weather monitoring systems, vehicles, smart home devices and sensors) may be collected. The collected data may be forwarded from the IoT devices 32 to a sensor gateway (not shown) within the customer premises, which forwards the collected data to and from various network elements that reside throughout the 5G network. The sensor gateway may forward the collected data to an LTE RAN (discussed below in respect to FIG. 4). The collected data may be received by the C-MME 43 within the EPC 14, which forwards the collected data to the CST 50, which also resides within the EPC 14. The DSDE-IA 51 may be implemented as a virtual machine. The DSDE-IA 51 may be used to create one or more analytics environments for a customer associated with the customer premises. The DSDE-IA 51 may be used to create each of the one or more analytics environments using an associated hypervisor. The DSDE-IA 51 may host a database (e.g., a Hadoop database) and include software (e.g., analytics programs) which may be used to map the collected data and reduce the collected data into business objects, functional tables, or dimensional tables. While the CST 50 and associated DSDE-IA 51 may be considered an element of the EPC 14, the one or more analytics environments and collected data contained within the DSDE-IA 51 can be accessed from network elements residing outside of the EPC 14. The DSDE-IA 51 may generate a data request (e.g., an ecosystem status request for CPE portion 30), dynamically, in response to the collected data, systems conditions, data requirements or network elements queries conducted by the DSDE-IA 51. The DSDE-IA 51 may output one or more reports in response to the data request to provide insight into a CPE portion 30 or network portion 12, via an Applications Programming Interface (API). The data request may be forwarded to various network elements (eNodeBs, MMES, etc.) or IoT devices 32. The DSDE-IA 51 may also dynamically issue one or more commands in response to the collected data, information data capture requirements or systems conditions to resolve issues within the customer premises or the 5G network.

A system hosting the customer API may include a customer DSDE-IA "(C-DSDE-IA) (not shown) which is able interface with the DSDE-IA 51 in a secure manner. The C-DSDE-IA may be used to interface with customers outside of the network. For example, a customer may utilize a web interface that communicates with the C-DSDE-IA to "provision" IoT devices 32 and uCST 55, as well as supporting information such as time of day, particular users, relevant security profiles, authorizations, data forwarding and receipt polices, etc. The DSDE-IA 51 may also include a security engine which may be used for provisioning, authentication and authorization of communication received from the customer premises. The security engine may access a provisioning database stored by the DSDE-IA 51 to retrieve customer profiles. The DSDE-IA 51 may include an analytics programming engine (APE) which hosts various analytics programs (e.g., Tableau, PowerBi, etc.), as well as interface with APEs residing outside of the EPC 14 (e.g., IBM Watson).

Accordingly, in response to receiving sensor data from IoT devices, as well as data associated with individual IoT sensors, location information associated with each of the IoT sensors, performance aspects and security information from the uCST 55, the DSDE-IA 51 may generate a data request triggering an analysis by one or more analytics programs of the DSDE-IA 51 to determine a state or status of a customer ecosystem or network in general. For example, a manufacturer may utilize temperature sensors to measure temperature in a designated portion of a plant. The uCST 55 residing at the plant may interface with the temperature sensors, via a wired connection or a wireless connection, e.g., WiFi, LTE, 5GNR, etc. The uCST 55 may forward the sensor data received from the temperature sensors to the CST 50 for integration. The uCST 55 may also request data (e.g., LBS information) associated with the temperature sensors and integrate the temperature data provided by the temperature sensors with received LBS information. The uCST 55 may also receive data from, for example, a security sensor located near a given temperature sensor. Accordingly, the uCST 55 can then aggregate LBS information, security data and temperature data in a record, which may be stored locally by the uCST 55 or forwarded to the CST 50. The CST 50 can provide information associated with the state or status of the ecosystem to the customer or adjust aspects of the network portion 12 or the CPE portion 30 based on the determined state or status of the ecosystem based on the received data and associated customer information (e.g., subscriber information, device information, location information, and security information). For example, the analysis of IoT sensor data including location information and individual IoT sensor data by the CST 50 can indicate network coverage gaps at designated locations within a customer ecosystem (e.g., CPE 30) or the network, in general. In response to the determination of network coverage gaps, the CST 50 may perform network optimizations by dynamically adjusting network performance parameters of the core network, providing a service request to the network carrier requesting installation of one or more macro sites or small cells, or to spin up/down one or more new gateways at designated locations at the customer premises or another part of the network, as needed, to address determined network coverage gaps. In addition to network coverage gaps, the network may be optimized based on usage pattern changes or in response to overloads. In another example, the analysis of IoT sensor data including location information and individual IoT sensor data can indicate poor network performance for a specified portion of the customer ecosystem. In response to the determination poor network performance for a specified portion of the customer ecosystem, the CST 50 may dynamically adjust performance aspects within the network portion 12 or the CPE portion 30 to resolve the determined performance issues. Optimizing may including performing actions that reduce latency, increase throughput, or reduce errors, among other things.

In an exemplary instance where the CST 50 performs network data capture and analyses, network data may be collected by a network carrier RAN and the network data may be sent from the network carrier RAN to the CST 50, which resides in the EPC 14. Additional data (e.g., records from the uCST 55 for integration, RAN records indicating connections between eNodeBs and sensors, sensor priority data, network performance data, network congestion data, etc.) may be received by the CST 50 from the C-MME 43, one or more eNodeBs or other network elements. The CST 50 can access network performance data, which may be stored in a CST network performance data repository. The DSDE-IA 51 may include an analytics programming engine (APE) which hosts various analytics programs (e.g., Tableau, PowerBi, etc.). The APE may be used by the CST 50 to perform LTE simulations using the network data and additional data to predict how a set of circumstances or change(s) to the network may affect network performance. For example, would adding sensors throughout a manufacturing plant adversely affect network performance for the entire network, adversely affect network performance for the manufacturing plant network or portion thereof, have no effect on network performance, etc.

The CST 50 may acquire data from the DSDE-IA 51 via a data request (e.g., a network performance request), dynamically, in response to systems conditions or data requirements. The network performance data request may be forwarded to various network elements (eNodeBs, MMES, etc.) or IoT devices 32. The DSDE-IA 51 may dynamically generate data requests in response to information data capture requirements or systems conditions associated with the network performance request. The CST 50 may dynamically adjust LTE simulations upon receipt of new network data from the RAN or other network elements.

To obtain insight into network performance, users can access/interface with the CST 50 via an API (e.g., a web-based system). The DSDE-IA 51 may be used to create each of the one or more analytics environments. The DSDE-IA 51 may include software (e.g., analytics programs) which can be used to analyze network performance based on the network data and additional data. Data and performance parameters used for simulations and analysis by the CST 50 may be changed dynamically in response to network conditions and external parameters. The DSDE-IA 51 may obtain data from outside the EPC 14 or a network to obtain a more complete picture of network carrier operations. The CST 50 may dynamically generate reports and on-demand reports related to operation of a network (e.g., network performance). The CST 50 may also generate an alert indicating a network issue(s), which can be sent to user via the API. In some instances, the CST 50 may dynamically adjust performance aspects within the network portion 12 or the CPE portion 30 to resolve the network issue(s) by, for example, directing uCST 55 to stop collecting data from certain sensors or direct certain eNodeBs to turn down power or to hand off cell service to another nearby eNodeB. The CST 50 may also interface with various Operations Support Systems (OSS) systems in order to provide predictive analytics to the various OSS systems, which can be used to manage an associated network (e.g., network inventory, service provisioning, network configuration and fault management).

Figure 2A:
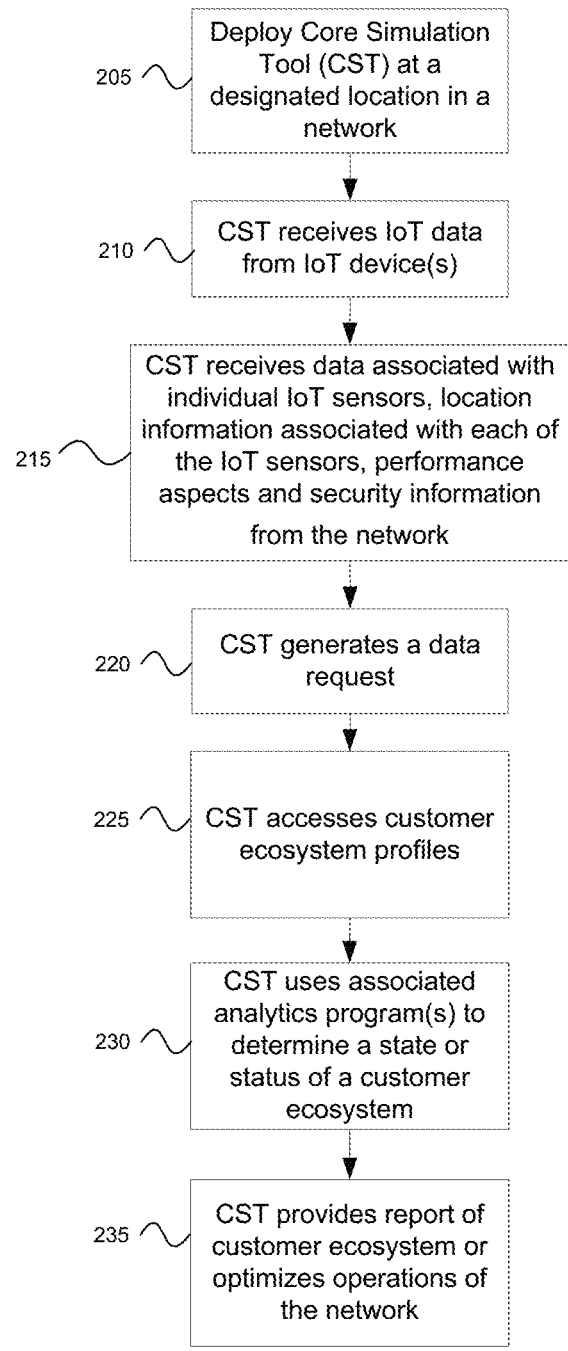
FIG. 2A is a flowchart of an exemplary method of operation for the architecture described in FIG. 1.

An exemplary operational flowchart in accordance with a method of the present disclosure is illustrated in FIG. 2A. At block 205, a core simulation tool (CST) 50, may be deployed within network carrier Evolved Packet Core (EPC) 14. At block 210, the CST 50 may receive IoT data from one or more IoT devices 32. At block 215, the CST 50 may receive additional data (e.g., data associated with individual IoT devices 32 and location information associated with each of the IoT devices 32). At block 220, the CST 50 may generate a data request. For example, the data request can be a request to obtain cell coverage data for the customer premises. At block 225, the CST 50 may access customer information (e.g., subscriber information, device information, location information, and security information), as well as customer profiles of the customer that are relevant to the data request. At block 230, the CST 50 may utilize analytics programs within the CST 50 to map and reduce the collected data, as well as determine a state or status of a customer ecosystem. At block 235, the CST 50 may provide the customer with a report of the state or status of the customer ecosystem or optimize operations of the network in response to the determination of the state or status of the customer ecosystem.

Figure 2B:
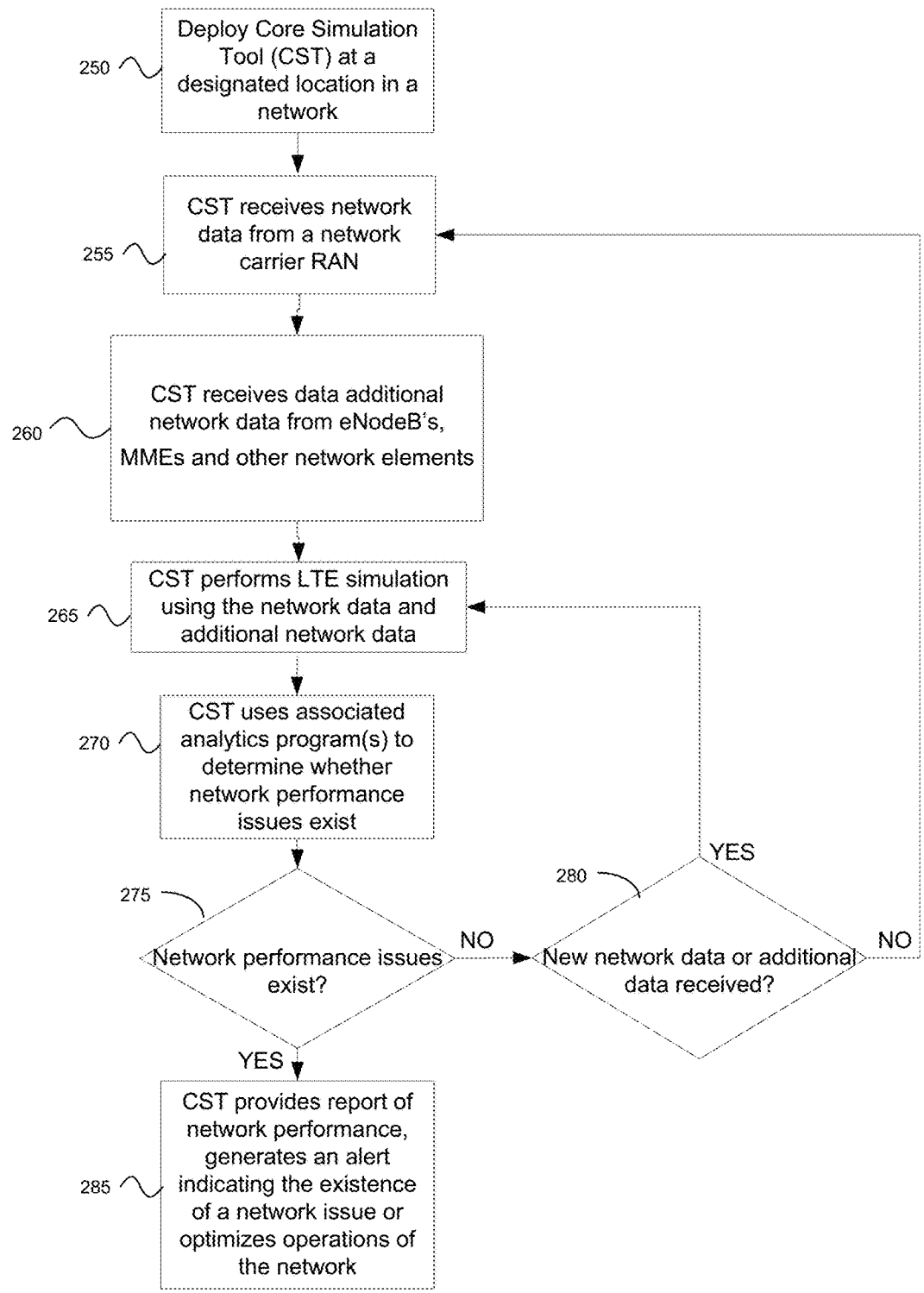
FIG. 2B is a flowchart of an exemplary method of operation for the architecture described in FIG. 1.

An exemplary operational flowchart in accordance with a method of the present disclosure is illustrated in FIG. 2B. At block 250, a core simulation tool (CST) 50 may be deployed at within network carrier Evolved Packet Core (EPC) 14. At block 255, the CST 50 may receive network data from a network carrier RAN 34. At block 260, the CST 50 may receive additional network data from eNodeBs, MMES, or other network devices. At block 265, the CST 50 may receive perform an LTE simulation using the network data and additional network data. At block 270, the CST 50 may utilize analytics programs within the CST 50 to determine whether network performance issues exist (e.g., devices failing to connect to the network carrier RAN 34, slow data transmission or data processing due to network congestion, backbone data circuit malfunctions, etc.) based on the received network data and additional network data. At block 275, if the CST 50 determines that network performance issues exist the method proceeds to block 285 where the CST 50 may provide a report about the network performance via an API. In response to network performance issues, the CST 50 may also generate an alert indicating the existence of network performance issues. In response to network performance issues, the CST 50 may also cause a network performance optimization to occur in order to rectify the network performance issues.

If the CST 50 determines that network performance issues do not exist, the method proceeds to block 280 where the CST 50 may determine whether new network data or new additional data has been received. If new network data or new additional data has been received, the method returns to block 265. If new network data or new additional data has not been received, the method return to block 255.

Figure 3:
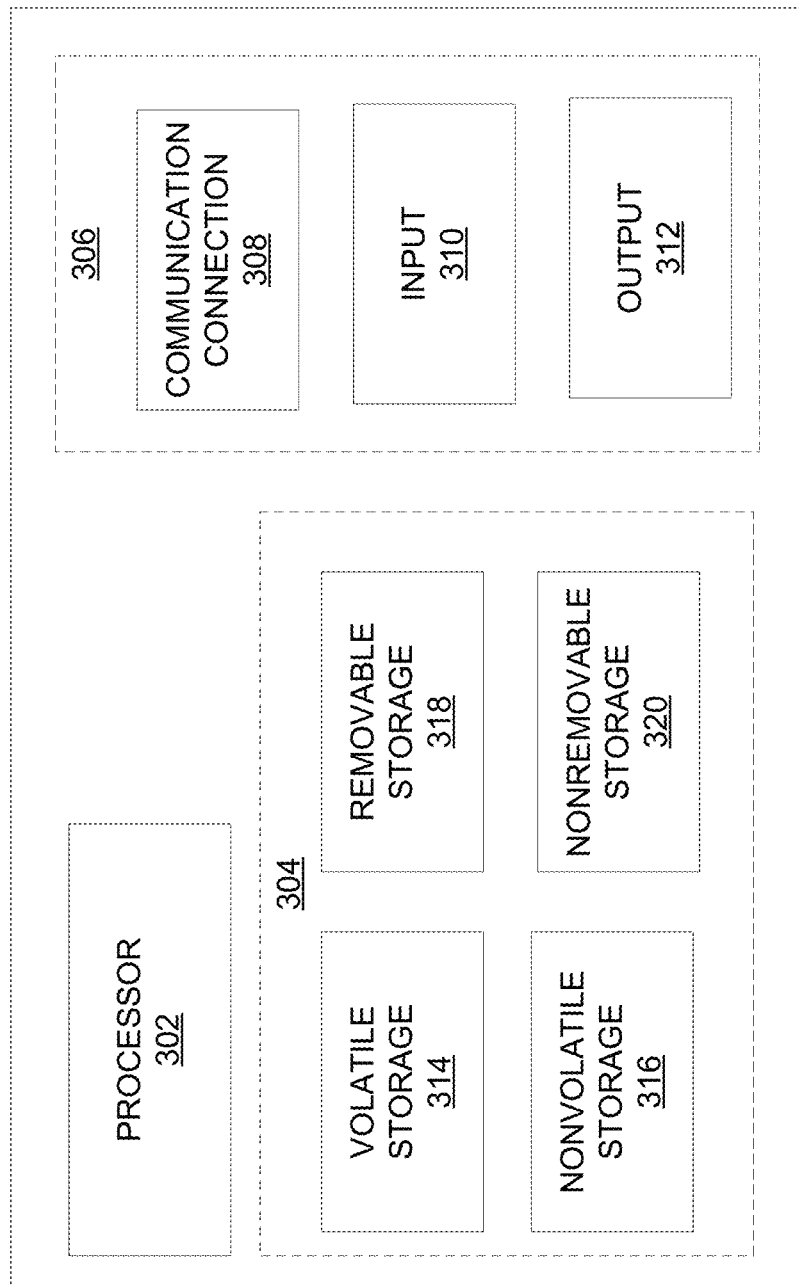
FIG. 3 is a schematic of an exemplary network device.

FIG. 3 is a block diagram of network device 300 that may be connected to or comprise a component of edge computing node 104 or connected to edge computing node 104 via a network (e.g., core network 12 of FIG. 1). Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
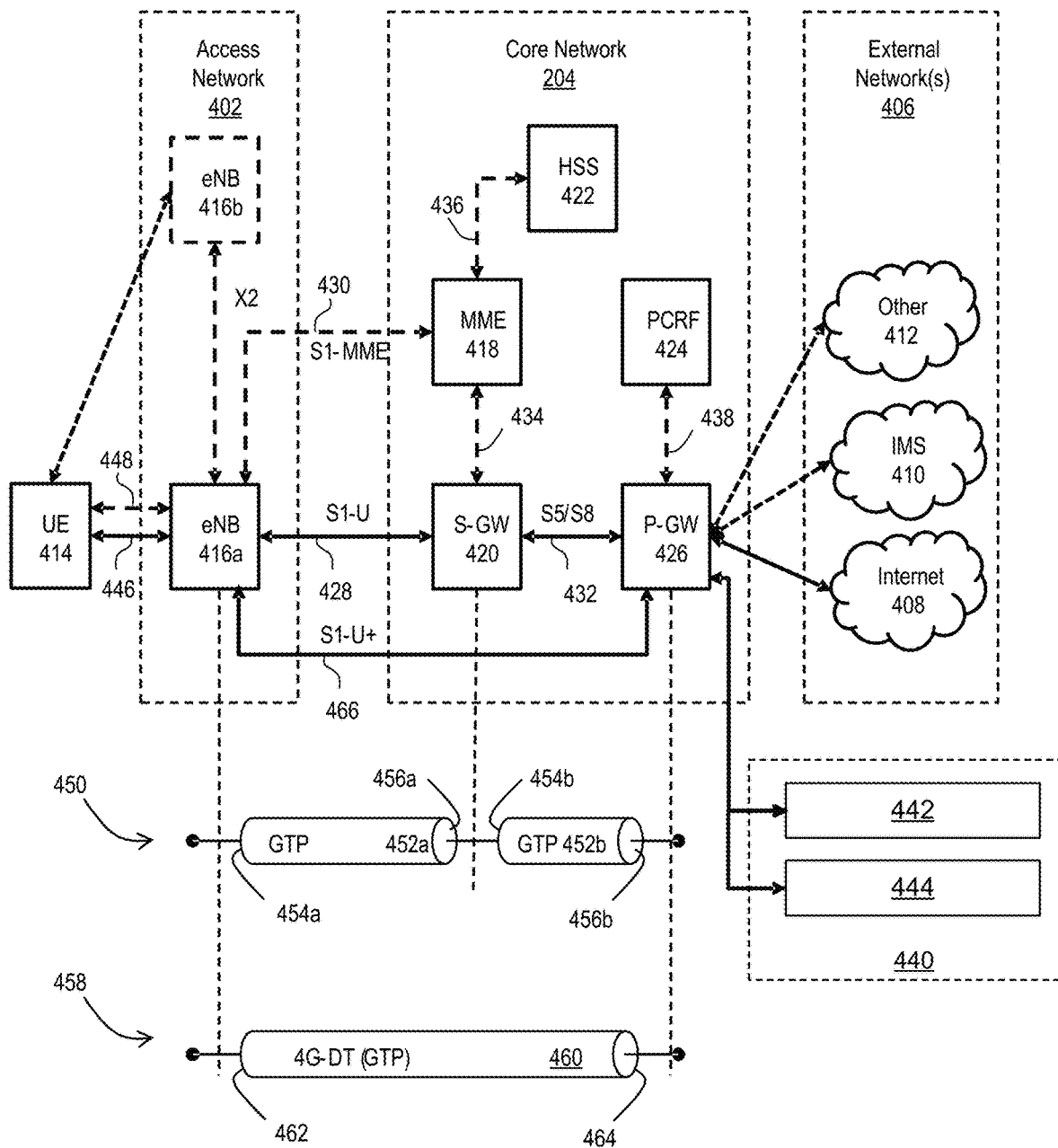
FIG. 4 depicts an exemplary communication system that provide wireless telecommunication services over wireless communication networks with which edge computing node may communicate.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches, and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
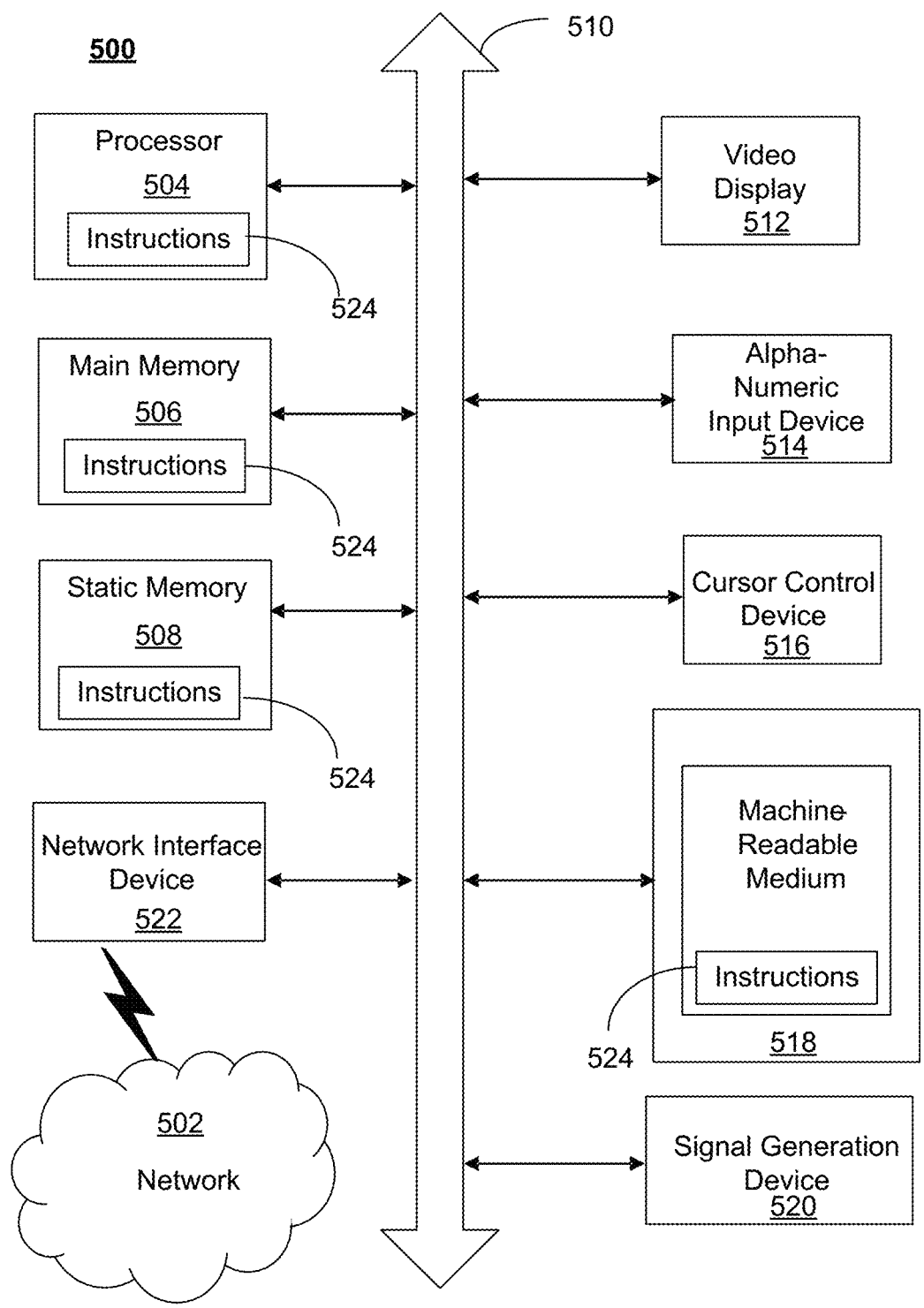
FIG. 5 depicts an exemplary communication system that provide wireless telecommunication services over wireless communication networks with which edge computing node may communicate.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
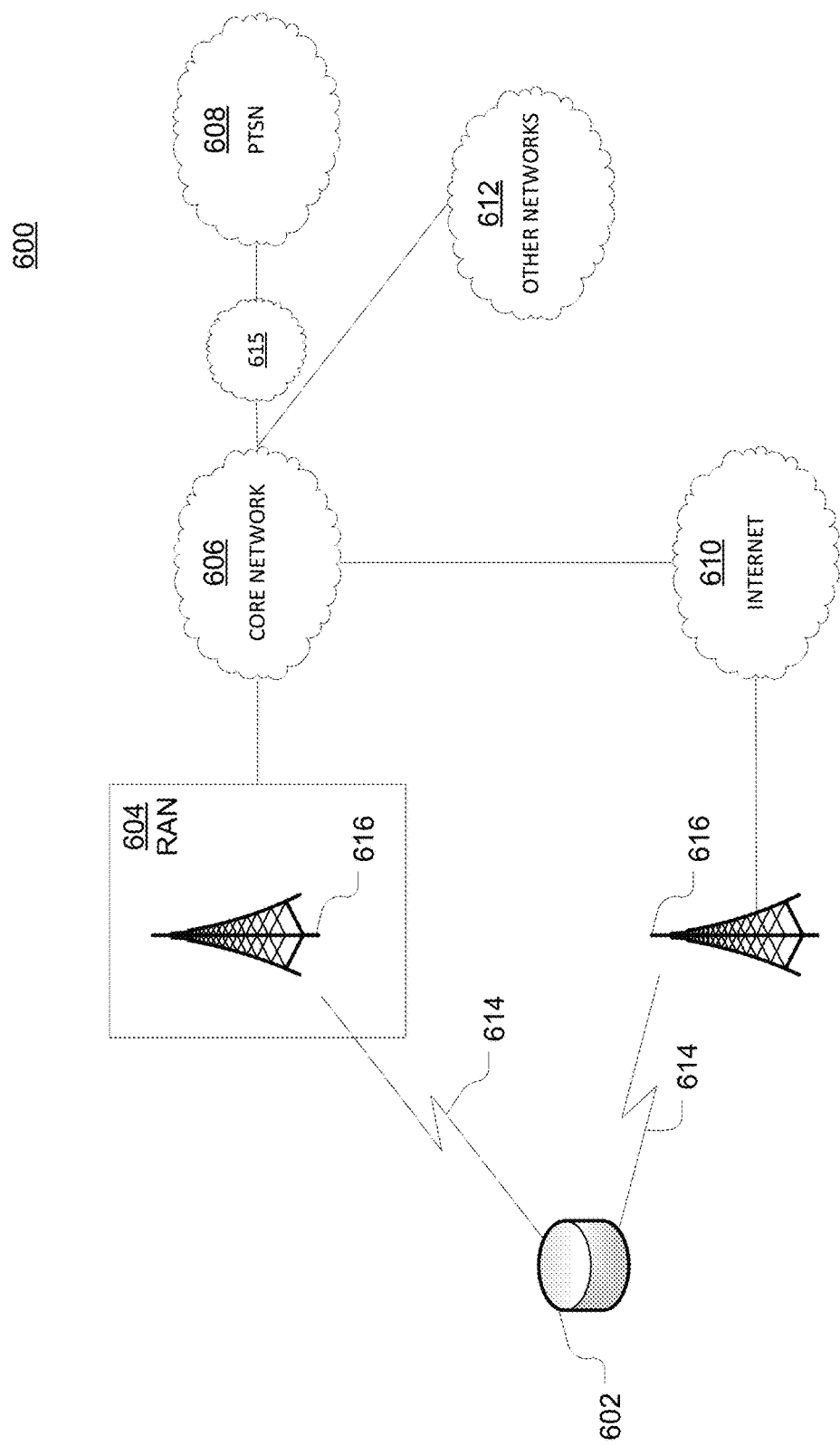
FIG. 6 is a diagram of an exemplary telecommunications system in which the disclosed methods and processes may be implemented with which edge computing node may communicate.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
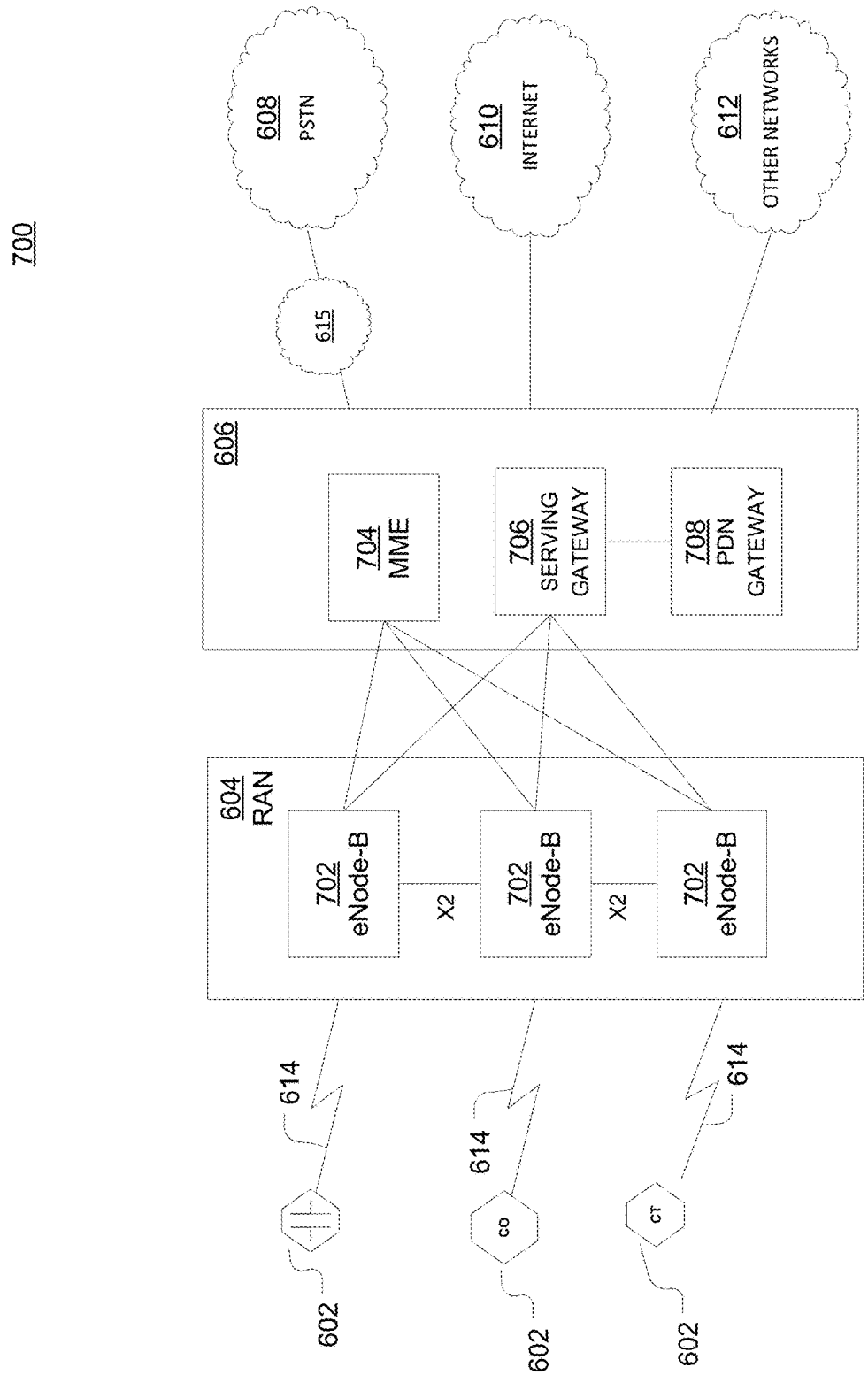
FIG. 7 is an example system diagram of a radio access network and a core network with which edge computing node may communicate.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeBs 702 may implement MIMO technology. Thus, one of eNodeBs 702, for example, may use multiple antennas to transmit wireless signals to, or receive wireless signals from, one of WTRUs 602.

Each of eNodeBs 702 may be associated with a particular cell (not shown) and may be configured to handle radio resource management decisions, handover decisions, scheduling of users in the uplink or downlink, or the like. As shown in FIG. 7 eNodeBs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeBs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
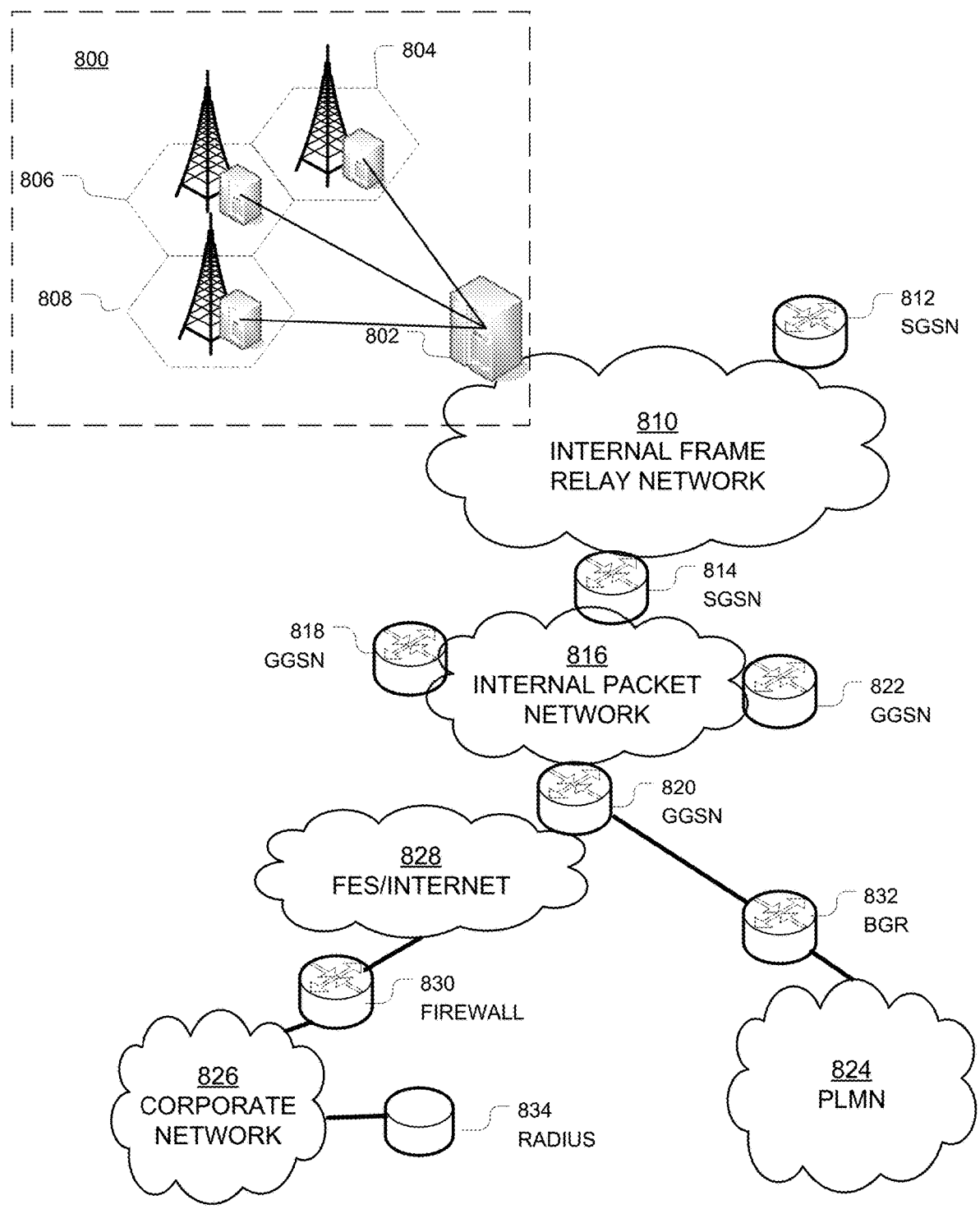
FIG. 8 depicts an overall block diagram of an example packet-based mobile cellular network environment, such as a general packet radio service (GPRS) network, with which edge computing node may communicate.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
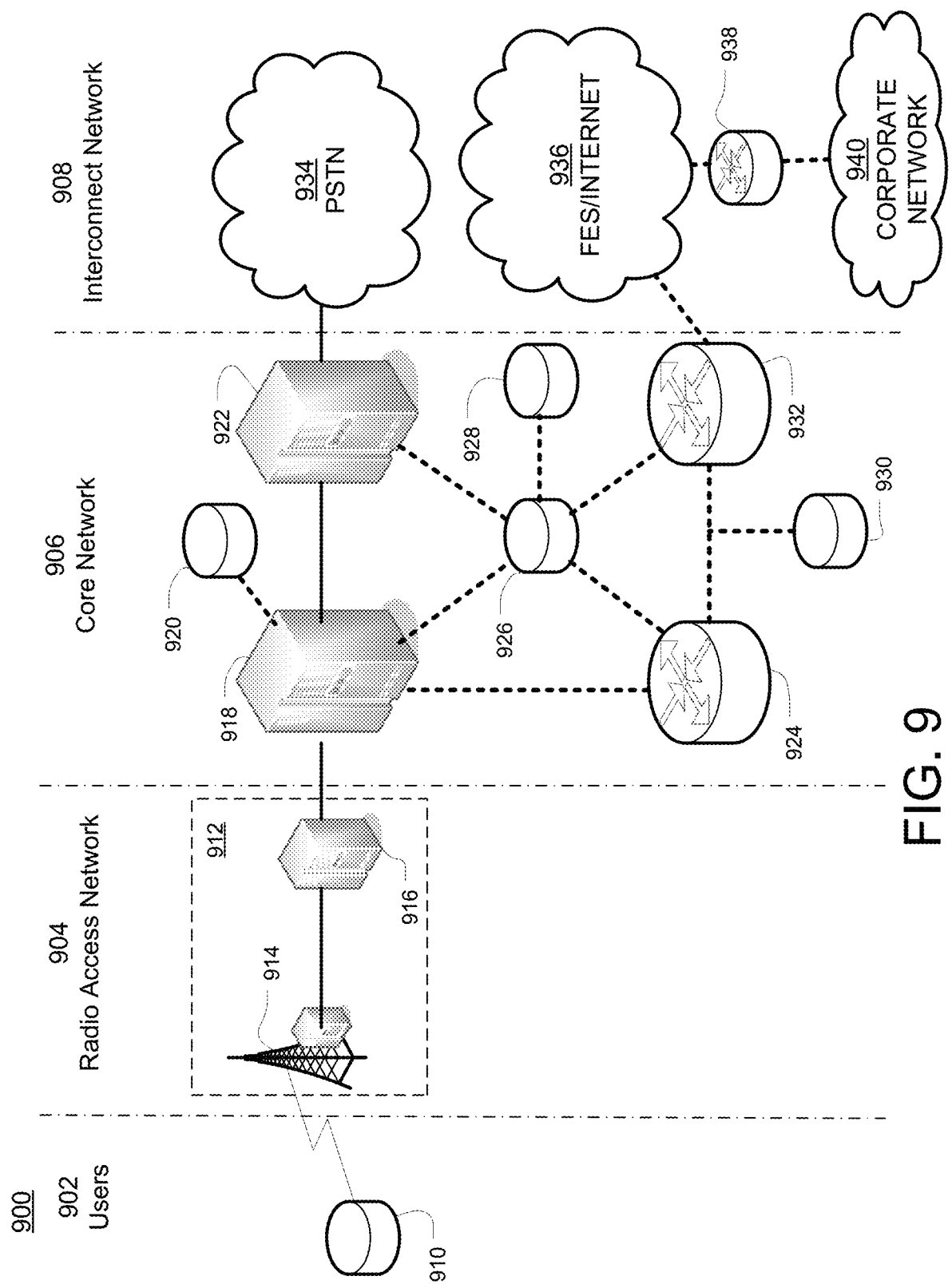
FIG. 9 illustrates an exemplary architecture of a GPRS network with which edge computing node may communicate.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., IoT devices 32, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, a FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
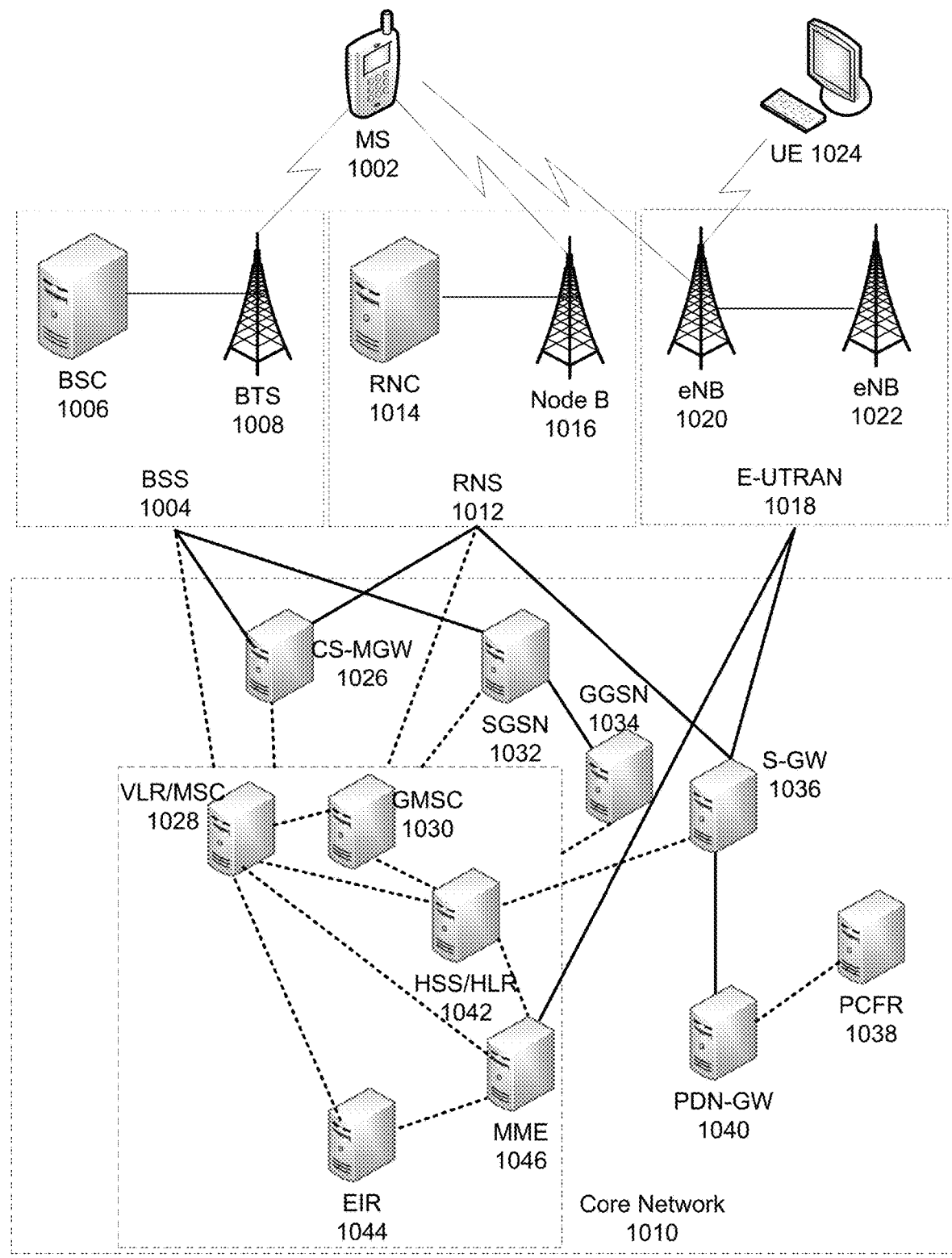
FIG. 10 is a block diagram of an exemplary public land mobile network (PLMN) with which edge computing node may communicate.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, IoT devices 32, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system may include a core simulation tool (CST) having a software defined engine (SDE) that can create an analytics environment(s) within an evolved packet core (EPC). The proposed analytics environment may be used to create analytical databases and run associated analytic tools within boundaries of the EPC. An advantage of the proposed telecommunications system is that a network carrier would be able to establish multiple analytics environments for each customer or multiple customers as required without leaving the EPC boundaries thereby creating greater efficiencies, performance, security, and control by the network carrier. The proposed analytics environment may also provide a greater degree of granularity into the operation of a customer's environment or the telecommunications network in general. For example, an analytical engine within the EPC core may be able to associate data with individual IoT sensors within the customer's environment, a location for each of these sensors within the customer's environment, and other performance and security information, which exists within an EPC core of the network carrier.

In addition to analyzing sensor data, the proposed analytics environment may be used to capture and analyze a Radio Access Network (RAN) utilization and performance. Data may be collected from RAN network elements (e.g., eNodeBs) for analysis. Accordingly, an internal network element (CST) internal to the EPC may be used to analyze RAN data, as well as and combine the RAN data with subscriber information, device information, location information, and security information. By analyzing RAN data in conjunction with data gleaned from network elements internal to the EPC, a finer granularity of network performance can be obtained.

The analysis by the CST can cause alerts to be generated (e.g., in response to network performance issues), cause network optimizations (e.g., installation/removal of macro sites, small cells, etc.) in response to a determination of coverage gaps within a customer premise or within the telecommunications network in general, and dynamically adjust network parameters of the EPC core to improve network performance.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A device comprising:
a processor; and
a memory coupled with the processor, the memory storing executable instructions that when executed by the processor, cause the processor to effectuate operations comprising:
deploying a user plane virtual network function in one or more customer premise equipment (CPE) devices of a CPE network of a plurality of CPE networks within a telecommunications network, wherein the user plane virtual network function receives sensor data associated with the one or more CPE devices and transmits the sensor data to a core simulation tool, and wherein the user plane virtual network function performs analytics on the sensor data of the one or more CPE devices within the CPE network;
based on the analytics on the sensor data, determining a status of the CPE network; and
based on the status of the CPE network, performing an action to optimize the CPE network.

2. The device of claim 1, wherein the one or more CPE devices comprises one or more Internet-of-things (IoT) devices.

3. The device of claim 1, wherein the one or more CPE devices comprises one or more Internet-of-things (IoT) devices, wherein the one or more IoT devices comprise smart meters.

4. The device of claim 1, wherein the one or more CPE devices comprises one or more Internet-of-things (IoT) devices, wherein the one or more IoT devices comprise weather monitoring system sensors.

5. The device of claim 1, wherein the one or more CPE devices comprises one or more Internet-of-things (IoT) devices, wherein the sensor data comprises location data for each of the IoT devices.

6. The device of claim 1, wherein the action to optimize the CPE network comprises reducing collection of the sensor data from the CPE network.

7. The device of claim 1, wherein the action to optimize the CPE network is based on usage pattern changes for the one or more CPE devices.

8. The device of claim 1, wherein the analytics performed on the sensor data is used to detect network coverage gaps at designated locations within the CPE network.

9. The device of claim 1, wherein the action to optimize the CPE network comprises adjusting network performance parameters of a core network of the telecommunications network.

10. A method comprising:
deploying, by a processing system comprising a processor, a user plane virtual network function at a designated location within a customer premise equipment (CPE) network of a telecommunications network;
receiving, by the user plane virtual network function, sensor data associated with one or more CPE device in the CPE network;
performing, by the user plane virtual network function, analytics on the sensor data of the one or more CPE devices within the CPE network;
based on the analytics on the sensor data, determining, by the user plane virtual network function, a status of the CPE network; and
based on the status of the CPE network, performing, by the user plane virtual network function, an action to optimize the CPE network.

11. The method of claim 10, wherein the one or more CPE devices comprises one or more Internet-of-things (IoT) devices.

12. The method of claim 10, wherein the one or more CPE devices comprises one or more Internet-of-things (IoT) devices, wherein the one or more IoT devices comprise smart meters.

13. The method of claim 12, wherein the one or more IoT devices comprise weather monitoring system sensors.

14. The method of claim 10, wherein the action to optimize the CPE network comprises reducing collection of the sensor data from the CPE network.

15. The method of claim 10, wherein the action to optimize the CPE network is based on usage pattern changes for the one or more CPE devices.

16. The method of claim 10, wherein the analytics performed on the sensor data is used to detect network coverage gaps at the designated location within the CPE network.

17. The method of claim 10, wherein the action to optimize the CPE network comprises adjusting network performance parameters of a core network of the telecommunications network.

18. A computer-readable storage medium storing executable instructions that when executed by a computing device cause said computing device to effectuate operations comprising:
implementing a user plane virtual network function at a designated location within a customer premise equipment (CPE) network, wherein the CPE network is a portion of a telecommunications network;
the user plane virtual network function receiving sensor data associated with one or more CPE devices of the CPE portion;
the user plane virtual network function performing analytics on the sensor data of the one or more CPE devices;
based on analytics on the sensor data, the user plane virtual network function determining a status of the CPE network; and
based on the status of the CPE network, the user plane virtual network function performing an action to optimize the CPE network.

19. The computer-readable storage medium of claim 18, wherein the analytics performed on the sensor data is used to detect network coverage gaps at the designated location within the CPE network.

20. The computer-readable storage medium of claim 18, wherein the action to optimize the CPE network comprises adjusting network performance parameters of a core network of the telecommunications network.

* * * * *